Patented May 9, 1939

2,158,034

UNITED STATES PATENT OFFICE 2,158,034

SILICON CARBIDE ABRASIVE PRODUCT AND METHOD OF MANUFACTURE

Lowell H. Milligan and Robert H. Lombard, Worcester, Mass., assignors to Norton Company, Worcester, Mass., a corporation of Massachusetts No Drawing. Application January 28, 1937, Serial No. 122,790

8 Claims. (Cl. 51—280)

The invention relates to silicon carbide abrasive products, such as grinding wheels, honing sticks and the like, bonded with ceramic, or vitrified, or inorganic oxide bonds. This application is a continuation in part of our copending application Serial No. 48,694 filed November 7, 1935.

One object of the invention is to provide a ceramic bond for silicon carbide which does not react materially therewith during firing. Another object of the invention is to provide a ceramic bond for silicon carbide which does not cause detrimental swelling of the article during firing.

Another object of the invention is to provide a ceramic bond for silicon carbide capable of being matured during a short period firing stage at a low temperature, thereby avoiding oxidation of silicon carbide. Another object of the invention is to avoid crazing of a wheel or other abrasive product. Another object of the invention is to eliminate oxidation of silicon carbide to silica.

Another object of the invention is to avoid the generation of carbon monoxide and carbon dioxide in a silicon carbide abrasive product as it is being matured. Another object of the invention is to provide a ceramic bond for silicon carbide avoiding detrimental reactions, such as the formation of undesired silicates. Another object of the invention is to prevent the formation of a pumice-like structure in the bond.

Another object of the invention is to avoid undesired variations in grade hardness of abrasive products having silicon carbide as the abrasive material. Another object of the invention is to provide a ceramic bond for silicon carbide whereby there may be manufactured, if desired, an abrasive product of a high degree of porosity. Another object of the invention is to provide a silicon carbide abrasive product of high tensile strength bonded with ceramic bond.

Another object of the invention is to achieve some or all of the foregoing objects, avoiding slumping of the product in the kiln. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

The grinding wheel made according to this invention may be termed a ceramic bonded grinding wheel and the word "ceramic" is used in its broadest sense as meaning composed of inorganic oxides matured by heat. Similarly, by reason of the fact that the product is produced by firing the formed shape in a kiln, it may be said to be "vitrified," although in a more restricted sense this means making something glass-like, and in the case of certain embodiments of the invention and under certain conditions, not all of the ingredients of the bond are converted, during firing, to the vitreous stage.

We provide a quantity of silicon carbide abrasive grain. This grain may be of any desired grit size for the manufacture of the desired type of abrasive product but we prefer to vary the bond formula within the limits hereinafter defined as the grit size of the silicon carbide varies, as will be hereinafter pointed out.

Our bond includes a prefired glassy frit which is cooled and crushed to a powder. Our bond further includes some plasticizing material. In one form of the invention we provide and mix with the frit a plastic clay or clays, taking care that the composition thereof is such that the total ingredients of the bond will be within the formula range hereinafter given. On the other hand, for certain products, we may plasticize the frit and abrasive grains with a solution of "Glutoline" or other organic plasticizer, which is burned out previous to or during firing and leaves no detrimental residue.

In order to avoid deleterious oxidation of the silicon carbide abrasive grain, and in order to achieve many of the objects hereinbefore given, we mature the formed shapes, consisting of the abrasive grain and the bond, at a relatively low firing temperature. We have found that a good product can be made using a temperature in the range between 860° C. and 1040° C. We prefer a temperature in the neighborhood of 925° C.

Considering now the bond as a whole, we select ingredients which, when fired at the low temperature range mentioned, will have the following fired formula for 90% at least thereof:

TABLE I

Fired bond formula; 90% of bond

|  | Percentages by weight |
|---|---|
| Silica, $SiO_2$ | 45 to 70 |
| Boric oxide, $B_2O_3$ | 15 to 40 |
| Alumina, $Al_2O_3$ | 3 to 20 |
| Oxide of alkali metal | 3 to 10 |

In the above table the oxide of alkali metal is preferably soda or potash or mixtures of the two. We prefer to use soda, because it is cheaper and more readily available. However, oxides of the other alkali metals may also be used. One function of these oxides of the alkali metals is to act as a flux. We may also include in the final formula of the bond a limited amount of alkaline earth flux, for example lime and magnesia.

Relatively speaking, silicon carbide is acidic in its reaction. Silica and boric oxide are also relatively acidic. Bonds made according to the above formula are, therefore, characterized as having relatively large proportions of relatively acidic ingredients. We desire to avoid as much as possible detrimental reactions with the silicon carbide grain during the maturing of the bond. We achieve this result by using a large proportion of relatively acidic ingredients. The use of a low temperature for maturing the bond also reduces reactivity between the bond ingredients and the silicon carbide and, furthermore, reduces detrimental oxidation of the silicon carbide grains, by the oxygen which may be present in the kiln atmosphere or otherwise. Therefore, these two features cooperate together to achieve the many objects of the invention heretofore stated. In order to cause the bond ingredients to soften sufficiently to bond together the silicon carbide abrasive grains, we have provided fluxing constituents comprising alkali metal oxide and boric oxide which lower the fusion point of the cementing glassy phase to the desired degree, at the same time achieving sufficient acidic nature by using the proportions indicated to limit deleterious reaction with the silicon carbide. By using boric oxide together with the limited amounts of soda and/or potash or other alkali metal oxide fluxes, with or without some lime, magnesia or other alkaline earth fluxes, we reduce the temperature at which the bond softens sufficiently.

In the above table the alkaline ingredients are limited in order that the net reaction of the entire bond ingredients during firing may be substantially non-reactive towards silicon carbide grain. Preferably we use only small quantities of the alkaline earth fluxes, if any. We desire to keep these ingredients to a maximum of 5%.

The alumina ingredient is a more or less neutral material and has valuable properties which include the quality of reducing reactivity of the bond toward silicon carbide. This may involve its specific chemical nature or may be connected with increase in the viscosity of the glassy phase attendant upon its use. At all events, we have found that beneficial results are achieved by the use thereof in the proportions indicated in the foregoing table.

The bond will generally include other ingredients which may be termed impurities. For example, titania, which is probably not detrimental up to several per cent, is present in one of our bonds made according to a preferred example hereinafter given to the extent of .6%. It is considered to be a relatively inert ingredient. Another impurity which is usually present, simply because it is practically impossible to eliminate all of it, is iron oxide, $Fe_2O_3$, which is more or less of a flux. In one of the preferred examples hereinafter given, it is present to the extent of .3%. If it could be eliminated, our invention could be well carried out without any of it, but on the other hand we believe that even as much as 2% might in some cases be present, still achieving some desirable results.

At least fifty per cent of the raw bond mixture from which the total bond formula in Table I is obtained, consists of a prefired and precooled glassy frit. For this, we take certain commercially available materials and fuse them together to a good fusion, then cool the glass and grind it to a powder. We prefer to quench the molten glass with water, thus granulating the glass in order to facilitate grinding. This frit has a minimum composition according to the following table:

TABLE II

*Frit composition—Minimum ingredients*

| | Percentages by weight |
|---|---|
| Silica, $SiO_2$ | 45 to 68 |
| Boric oxide, $B_2O_3$ | 20 to 40 |
| Oxide of alkali metal | 3 to 10 |

During firing of the product in a kiln, the frit softens at a low temperature. The remaining bond ingredients may not all of them soften with the frit. We, therefore, use a frit which itself is relatively non-reactive towards silicon carbide abrasive grain. In the above table it will be seen that the silica and the boric oxide constitute a total proportionate amount at least 65% of the entire frit. These materials are relatively acidic and relatively non-reactive towards silicon carbide abrasive grain. The frit softens at a low temperature on account of the relatively high proportion of the total fluxes, boric oxide and alkali metal oxide, that are present. The oxide of the alkali metal cooperates to unite the silica and boric oxide together into a serviceable frit, but the amounts of alkali metal oxide employed are sufficiently low to prevent deleterious alkalinity and to maintain the required acidic nature of the frit. The frit may also include other ingredients, for example it usually has some alumina, and may contain a little alkaline earth oxide to improve its chemical stability and resistance toward water. In so far as certain features of the invention are concerned and under certain conditions, the entire bond may comprise the frit, in which case the frit will satisfy the conditions in Table I as well as in Table II.

*Example I*

For the manufacture of silicon carbide abrasive products using abrasive grain of grit sizes ranging between 60 mesh grit size and 220 mesh grit size, we may proceed as follows:

Taking a quantity of silicon carbide abrasive grain of grit size #80, we provide a ground frit made as follows: Thirty-three and eight tenths per cent by weight of borax, 26.7% by weight of boric acid, and 39.5% by weight of flint ($SiO_2$) are ground and thoroughly mixed together, then fused, quenched with water and reground. The calculated chemical composition, by weight, of this frit is as follows:

TABLE III

*Frit composition*

| | Per cent |
|---|---|
| Silica, $SiO_2$ | 54.5 |
| Boric oxide, $B_2O_3$ | 37.9 |
| Soda, $Na_2O$ | 7.6 |

Taking 75 parts by weight of the frit of Table III, we add 25 parts by weight of Kentucky ball clay and 5 parts by weight of mullite powder. These ingredients are thoroughly mixed together and constitute the bond according to this example of the invention. This bond has the following total calculated chemical composition by weight:

TABLE IV

Example of bond composition

|  | Per cent |
|---|---|
| Silica, $SiO_2$ | 57.7 |
| Boric oxide, $B_2O_3$ | 27.5 |
| Alumina, $Al_2O_3$ | 8.1 |
| Soda, $Na_2O$ | 5.6 |
| Potash, $K_2O$ | .1 |
| Lime, CaO | .1 |
| Magnesia, MgO | .1 |
| Titania, $TiO_2$ | .6 |
| Ferric oxide, $Fe_2O_3$ | .2 |

As one specific example of making a grinding wheel with the bond of our invention, we may take one and one-half ounces of bond to one pound of silicon carbide abrasive grain. The grain and the bond should be well mixed and the preferred procedure is as follows: Place the grain in a mixing pan or mixing machine, add water and distribute the water evenly throughout the grain, then add the bond and continue mixing. When a good mix has been achieved, a measured quantity of the abrasive grain and bond is placed in a suitable mold, pressed and then the mold is stripped and the pressed or "green" product is removed. This is then dried in an oven to remove the water and finally is fired in a kiln at the temperature range hereinbefore given.

The preferred firing practice is as follows: The temperature is raised to 925° C. within two or three hours time, then maintained at this temperature for in the neighborhood of four and one-half hours, then cooled for a somewhat longer period, for example around twelve hours, to room temperature.

According to this preferred example above given, the plasticizer is the ball clay. There being a considerable quantity of ball clay present, the mass is plastic. In certain cases we may add a quantity of a temporary binder to give added green strength. Such a temporary binder is preferably an ingredient which will burn out, leaving no detrimental residue prior to attaining the highest temperatures in the kiln. We may use "Glutoline" (methyl ether of cellulose or we may use dextrine. It should be understood that the proportions of abrasive grain and bond will be varied in order to obtain specific grinding wheel structures and structures in other abrasive products and the ratio given is a mere example and over a long range every embodiment is a preferred example for grinding under particular conditions, but this variation of grinding wheels and other abrasive products is well understood.

In certain cases we find it advantageous to add to the frit composition a quantity of hydrate of alumina, usually less than 5%. This introduces some of the $Al_2O_3$ ingredient into the frit. This, and also lime which may be added to the frit, tends to reduce solubility of the frit.

Example II

For the manufacture of silicon carbide abrasive products using abrasive grain of grit sizes ranging between 240 mesh grit size and 600 mesh grit size, we may proceed as follows:

Taking a quantity of silicon carbide abrasive grain of grit size #500, we provide a ground frit made as follows, percentages being by weight: Twenty-one and three tenths per cent of borax, 16.9% of boric acid, 51.4% of ground flint ($SiO_2$), 9.9% of hydrate of alumina ($Al_2O_3+3H_2O$), 33% of calcium carbonate, and .16% of magnesia are ground and then thoroughly mixed together, then fused and quenched with water, and then reground to an impalpable powder. The calculated chemical composition, by weight, of this frit is as follows:

TABLE V

Frit composition

|  | Per cent |
|---|---|
| Silica, $SiO_2$ | 65.09 |
| Boric oxide, $B_2O_3$ | 21.90 |
| Alumina, $Al_2O_3$ | 8.20 |
| Soda, $Na_2O$ | 4.38 |
| Lime, CaO | .23 |
| Magnesia, MgO | .20 |

The frit of Table V may be used without any plastic clay, but with a suitable plasticizer and temporary binder, for example 3% solution of "Glutoline" to make a grinding wheel or other abrasive product in accordance with the general procedure given for Example I, or any other desired procedure of mixing abrasive grain and bond. As a mere example of one structure, we may take 30 lbs. of this 500 grit silicon carbide and 8 lbs. of the frit of Table V moistened with a 3% solution of "Glutoline", pressed and fired in accordance with the procedure given for Example I.

With regard to the fine grit size products, we prefer to use a relatively high silica content and more alumina in the frit to reduce reactivity. In this case, these constituents in the fired bond may be derived largely from the frit, because we may use a lesser amount of plastic clay, or none at all as in the example given when bonding fine grit sizes.

Furthermore, during the firing of fine grit products, the presence of clay or other similar material in the bond is less important than for coarse grit products for two reasons, viz:

(1) The fine grains of silicon carbide function mechanically as an undissolved or partially undissolved constituent in a manner somewhat similar to clay, toward increasing the apparent viscosity of the bond as a whole, because as the grit size of the abrasive grain decreases, the capillary attraction of the fluid bond is greater in proportion to the mass of each individual grain.

(2) The larger percentage of alumina and silica in the frit usually employed for bonding fine grit sizes makes the frit itself more viscous, and for this reason a lesser amount of clay could be used.

A feature of this invention resides in the provision of a bond which not only matures at a low temperature where oxidation of the grains is low, but which also may be matured rapidly so that the total time of firing is comparatively short. This not only saves expense in manufacturing the article, such as a grinding wheel, but it also reduces the possibility of oxidation of silicon carbide grains substantially to a minimum. This short firing period is achieved because the reactions between many constituents of the bond have been completed at a high temperature in the manufacture of the frit.

Features of the product made according to this invetion are that a much greater per cent of the silicon carbide abrasive grain, by weight, which was put into the mix, remains in the final matured product. Also, this makes possible the improved control of the properties of the product which is so desirable, especially in the case of products used for sensitive grinding operations. Furthermore, the tensile strength for a given volume structure of the grinding wheel is increased.

One reason why a wheel or other abrasive product bonded according to the invention has greater tensile strength is because such portion of the bond as was derived from the frit exists in the form of a glassy cementing phase which has high strength for its given chemical composition. That is to say, by proceeding according to the invention, the physical characteristics of the bonding are such as to result in a greater strength thereof than would be the case if a lesser amount of the ingredients had been converted to the molten stage. As a corollary to this feature of the invention, it is possible to make a highly porous wheel which is as strong as less porous wheels made with previously known porcelanic bonds. As tensile strength in a grinding wheel is a vital factor it, therefore, may be said that it is possible according to the invention to make a silicon carbide grinding wheel of a high degree of porosity.

It will thus be seen that there has been provided by this invention a method and an abrasive article in which various objects hereinabove set forth together with many thoroughly practical advantages are successfully achieved. As various possible embodiments might be made of the chemical features of the above invention and as the art herein described might be varied in various parts, all without departing from the scope of the invention, it is to be understood that all matter hereinbefore set forth is to be interpreted as illustrative and not in a limiting sense.

We claim:

1. The method of making bonded silicon carbide products comprising the steps of mixing bond constituents which will provide a relatively acidic borosilicate glassy frit containing 45% to 68% by weight of $SiO_2$, 20% to 40% of $B_2O_3$ and 3% to 10% of alkali metal oxide, fusing said ingredients at a temperature at which the reactions are completed, cooling the frit and pulverizing it, mixing silicon carbide grains with the frit and a plasticity developing agent and shaping an article therefrom, thereafter firing the shaped article at a temperature between 860° C. and 1040° C. to vitrify the bond and subsequently cooling the mass and thereby providing a bonded article in which the solicon carbide grains have not reacted materially with the bond.

2. The method of making a silicon carbide article according to claim 6 in which ceramic bonding materials comprising a plastic clay are mixed with at least 50% of the frit, and the fired bond has the following formula for 90% at least thereof: $SiO_2$ 45% to 70% by weight, $B_2O_3$ 15% to 40%, $Al_2O_3$ 3% to 20% and oxide of alkali metal 3% to 10%.

3. A silicon carbide article comprising silicon carbide grains united by a vitrified ceramic bond formed from a plasticity developing agent and a prefired glassy frit, the latter constituting at least 50% of the initial bond ingredients, and at least 90% of said bond containing 45% to 70% by weight of $SiO_2$, 15% to 40% of $B_2O_3$ and 3% to 10% of alkali metal oxide, and the bond maturing at a temperature below 1040° C. and being relatively acidic in nature and substantially non-reactive to the silicon carbide at the firing temperature.

4. A silicon carbide article comprising silicon carbide grains bonded by a vitrified ceramic material made from a prefired glassy frit forming at least 50% of the bond and a plasticity developing clay material, at least 90% of said bond comprising 45% to 70% of $SiO_2$, 15% to 40% of $B_2O_3$, 3% to 10% of alkali metal oxide and 3% to 20% of $Al_2O_3$, said bond maturing at a temperature between 860° C. and 1040° C. and being relatively acidic in nature and substantially non-reactive towards silicon carbide at the firing temperature.

5. A vitrifiable ceramic bond comprising a prefired granulated frit combined with material capable of proving the required plasticity and viscosity for bonding silicon carbide grains, the frit constituting at least 50% of the total mass, and at least 90% of the total bond containing $SiO_2$ within the range of 45% to 70%, $B_2O_3$ within the range of 15% to 40% and alkali metal oxide within the range of 3% to 10%, and the bond being relatively acidic in nature and capable of maturing at a temperature between 860° and 1040° C. without reacting materially with silicon carbide grains bonded thereby.

6. A bond of the type covered by claim 5 which contains from 3% to 20% of $Al_2O_3$ and which has a high content of acidic metal oxides and a low content of basic metal oxides and is substantially non-reactive to the silicon carbide at a temperature below 1040° C.

7. A bond of the type covered by claim 5 wherein the prefired granulated frit is combined with plastic ball clay for rendering the mass moldable.

8. A bond of the type covered by claim 5 wherein the prefired granulated frit contains $SiO_2$ within the range of 45% to 68%, $B_2O_3$ within the range of 20% to 40% and alkali metal oxide within the range of 3% to 10% by weight.

LOWELL H. MILLIGAN.
ROBERT H. LOMBARD.

CERTIFICATE OF CORRECTION.

Patent No. 2,158,034. May 9, 1939.

LOWELL H. MILLIGAN, ET AL.

It is hereby certified that error appears in the printed specification of the above numbered patent requiring correction as follows: Page 4, first column, line 56, claim 2, for the claim reference numeral "6" read 1; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.